March 3, 1964    B. C. BLAIR    3,123,019
ARTICLE VIBRATING MACHINE
Filed April 23, 1962    2 Sheets-Sheet 1

INVENTOR.
BOYD C. BLAIR
BY
Fishburn and Gold
ATTORNEYS

March 3, 1964      B. C. BLAIR      3,123,019

ARTICLE VIBRATING MACHINE

Filed April 23, 1962      2 Sheets-Sheet 2

INVENTOR.
BOYD C. BLAIR
BY Fishburn and Gold
ATTORNEYS 3,123,019
ARTICLE VIBRATING MACHINE
Boyd C. Blair, Topeka, Kans., assignor to Brackett Stripping Machine Company, Topeka, Kans., a partnership
Filed Apr. 23, 1962, Ser. No. 189,612
6 Claims. (Cl. 108—21)

This invention relates to vibrating machines, and more particularly to a machine for imparting substantially vertical vibrations to articles thereon.

The principal objects of the present invention are to provide an article vibrating machine with a vibratory table resiliently and adjustably mounted relative to its supporting frame whereby on vibration of the table vertical movement is uniformly imparted to articles supported thereby with the movement being uniform over the area of the table both as to amplitude and frequency; to provide such a structure wherein the vibratory movement imparted by the table is such that loose articles distributed thereon remain uniform in distribution; to provide such a machine wherein the mechanical connections between the actuator and the vibratory table are constructed for positive vibratory movement of the table for silent operation and without objectionable transmission of vibrating forces through the supporting frame; to provide such a structure wherein the amplitude of the vibrations is adjustable; and to provide a vibratory machine of this character which is simple in construction, efficient in operation and easily adjustable to level the table and for uniformity of vibratory movement of the table.

Other objects and advantages of this invention will become apparent from the following description taken in connection with the accompanying drawings wherein are set forth by way of illustration and example certain embodiments of this invention.

FIG. 4 is an enlarged partial vertical sectional view through an adjustable resilient table support.

FIG. 5 is an enlarged vertical sectional view through the vibratory actuator and connections with the table.

FIG. 6 is a detail sectional view through an adjustable eccentric of the vibratory actuator.

Figure 1:
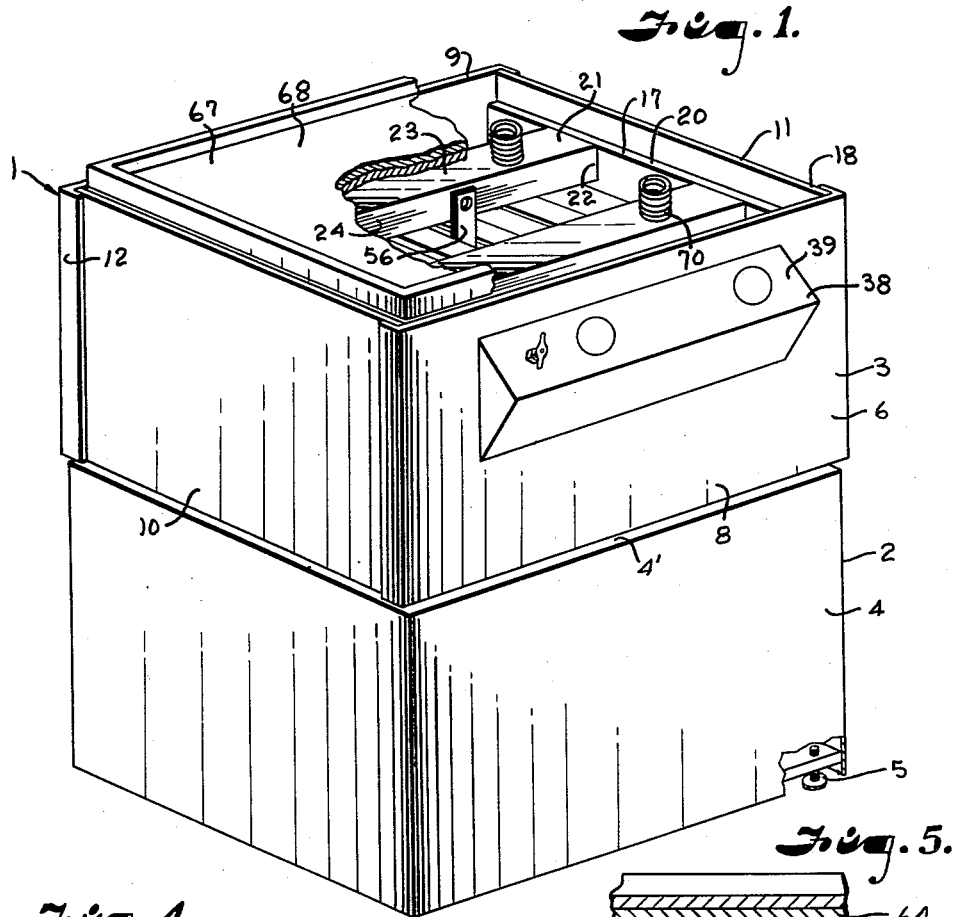
FIG. 1 is a perspective view of a vibratory machine embodying the features of the present invention.
Figure 2:
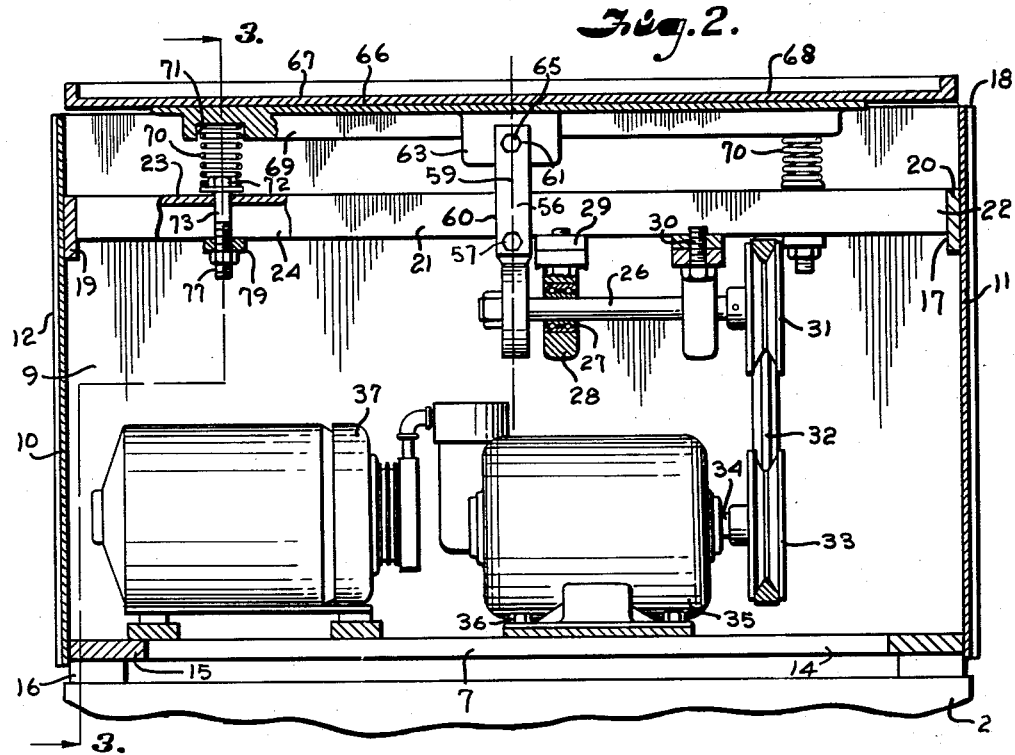
FIG. 2 is a vertical sectional view through the upper portion of the vibratory machine taken on the line 2—2, FIG. 3.

Referring more in detail to the drawings:

The reference numeral 1 generally designates a vibratory machine constructed in accordance with the present invention and which includes a relatively rigid base or support 2 and a vibratory table 3 carried thereby, as later described. In the structure illustrated, the base 2 may include a cabinet or other structure 4 having adjustable supports 5 suitably arranged thereon and adapted to rest on a floor or the like whereby the upper surface 4' and the base 2 may be substantially leveled.

The support structure 2 has an upper housing 6 which has a bottom frame 7, front and rear walls 8 and 9, and opposed side walls 10 and 11 rigidly connected together to define an open top housing structure. In the structure illustrated, the front and rear walls 8 and 9 have flanges 12 at their ends overlying adjacent portions of the side walls 10 and 11 and are secured thereto whereby the flanges 12 impart rigidity to the housing. The housing 6 has a rigid bottom frame 7 consisting of members 14 extending from the side wall 10 to the side wall 11 and rigid bar members 15 extending from the front wall 8 to the rear wall 9, the members 14 and 15 being suitably and rigidly secured together and to the walls of the housing. Also secured to the frame members are legs 16 depending below the bottom frame 7 and adapted to rest on the upper surface 4' of the base 2.

An upper frame 17 is arranged in the housing and is spaced below the upper edges 18 of the front, rear and side walls. The upper frame in the illustrated structure consists of rigid bar-like members 19 and 20 secured to the inner faces of the side walls 10 and 11 and extending across the width thereof. The frame 17 also includes transverse rail members 21 arranged in laterally spaced relation and having ends 22 secured as by welding to the frame members 19 and 20. In the illustrated structure, the rail members 21 are in the form of channels with the webs 23 at the upper portion thereof and the flanges 24 depending therefrom, said rails 21 being equally spaced from a median vertical plane designated by the broken line 25 preferably centrally located between the front wall 8 and rear wall 9.

A shaft 26 is preferably supported in substantially horizontal relation and rotatably mounted in bearings 27 carried by spaced bearing blocks 28 which are suitably secured in depending relation relative to the rails 21 to rotatably mount the shaft 26 with its axis in said median plane 25. In the illustrated structure, there are spaced mounting bars 29 suitably secured to the flanges 24 of the rails 21 and said bearing blocks or housings 28 are secured to said bar members 29 by suitable fastening devices such as screws 30. One end of the shaft 26 has a pulley 31 fixed thereto that is operatively connected by a belt 32 with a pulley 33 on a shaft 34 of a motor 35, said motor being secured by suitable fastening devices such as screws 36 to the member 14 of the bottom frame. It is also preferred that a motor driven vacuum pump 37 be mounted on members 15 of the bottom frame and operable to provide a vacuum or air if desired for use with articles to be vibrated by the machine. The front wall 8 of the housing has an outwardly extending portion 38 providing an inclined wall 39 adapted to carry controls and meters as may be desired in the operation of the machine. The rear wall 9 preferably has a door opening 40 normally closed by a hinged door 41 which, when opened, provides access into the interior of the housing.

The end portion of the shaft 26 opposite the end carrying the pulley 31 is preferably provided with an eccentric 42 secured to the shaft 26 by a key or the like 43. A second eccentric 44 has a bore 45 sleeved on and rotatably engaging the outer face 46 of the eccentric 42. The eccentric 44 is adjustable circumferentially relative to the eccentric 42 to adjust the combined throw of the two eccentrics. In the structure illustrated, the eccentric 42 has a flange 47 with an aperture 48 therein registrable with selected threaded apertures 49 in the eccentric 44 and spaced circumferentially thereof whereby when the eccentrics 42 and 44 are rotated relative to each other to align an aperture 48 with a threaded aperture 49 for a selected throw for the combined eccentrics, a fastening device 50 such as a screw is inserted through the aligned apertures to secure the eccentrics in adjusted position. It is preferred that the eccentrics be held in position on the shaft 26 by the end of the shaft being threaded as at 51 and a nut 52 threaded thereon. An eccentric strap 53 is rotatably mounted on roller bearing 54 on the eccentric 44, said eccentric strap having a lug 55 to which is secured one end of a spring leaf connector 56 by a suitable fastener such as a screw 57. In the illustrated structure, the lug 55 is offset whereby it has a face 58 on which one end of the leaf spring connector 56 is engaged. The leaf spring connector, in the illustrated structure, consists of two or more thin flat springs and are preferably arranged whereby a centrally positioned face thereof is substantially in the vertical plane 25 that extends through the axis of the shaft 26. Also, a vertical plane designated by the line 59 centrally of the table structure and preferably midway between the side walls 10 and 11 extends through the leaf spring connector in substantially equally spaced relation to the edges 60 thereof. The other end 61 of the spring connector is engaged with a face 62 of a lug 63 that depends from a sub-table member 64, said leaf spring connector being secured to the lug 63 by a suitable fastening device such as a screw 65.

Figure 3:
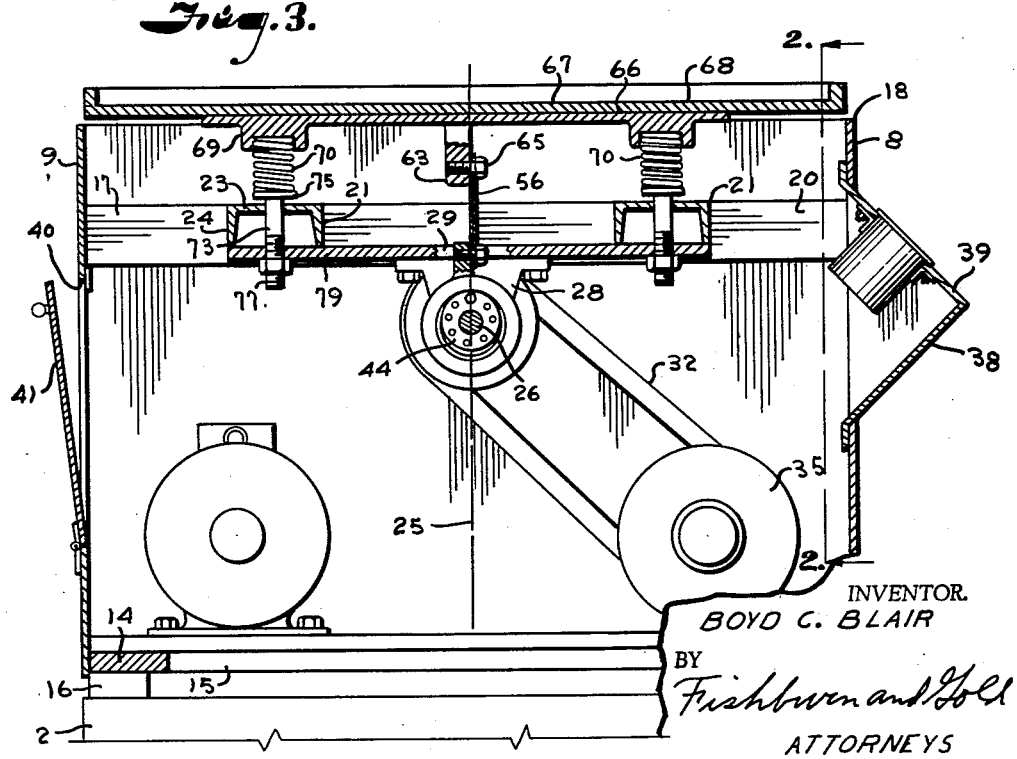
FIG. 3 is a vertical sectional view through the machine taken on the line 3—3, FIG. 2.

The sub-table 64 has a flat upper face 66 on which is suitably mounted and secured a table panel member 67 which has a flat upper face 68 adapted to receive articles to be vibrated. The sub-table 64 has spaced depending elongate portions 69 serving to provide rigidity, said depending portions 69 in the illustrated structure extending longitudinally of the rails 21 and thereabove, as illustrated in FIG. 3.

The table structure 3 is resiliently supported by means of a plurailty of resilient members 70 each having an upper end engaged in a respective recess 71 in the depending portions 69 of the sub-table, and a lower end engaged with a head 72 of an adjusting member 73. In the illustrated structure, each of the resilient members 70 are in the form of coil springs, there being four in number with two on each side of and equally spaced from the median plane 59. Also, the springs are arranged whereby two are on each side and equally spaced from the median plane 25, the intersecting line of the median planes extending substantially vertically through the center of the table whereby each of the springs are equally spaced from said center line. In the illustrated structure, the adjusting means 73 each consists of a threaded member or shank 74 with the head 72 provided with a flange 75 on which the lower end of the spring 70 seats, the lower end surrounding the head portion above the flange. The shank 74 extends downwardly through a bore 76 in the web 23 of the respective channel members or rails 21 and the threaded portions 77 of the shanks are screwed through threaded bores 78 in plate members 79 that extend transversely below the flanges 24 and are suitably secured thereto as by welding. The lower end of each shank 74 has a socket 80 to receive a suitable wrench or the like for rotating the shanks to adjust same up and down to raise or lower the springs 70 and the table structure 3. The adjusting members may be adjusted individually to level the table top and, when in selected position, a lock nut 81 is threaded on the lower end of each threaded shank 74 into engagement with the plate to hold the adjusting members in position.

It is preferred that the table top or panel member 66 or a member mounted thereon have upwardly extending flanges or walls 82 to define a confining structure to receive articles to be vibrated or processed. The leaf spring connector 56 and the resilient members 70 cooperate in positioning the table, the adjustment of the resilient members 70 in cooperation with said leaf spring connector providing for leveling the upper surface of the table panel and in operation the motor drives the shaft 26, rotating the eccentrics 42 and 44 to provide an oscillatory motion through the leaf spring connectors 56 to the table structure, imparting a vertical motion thereto. With articles to be vibrated distributed over the surface 68, the vibratory motion is then started and, with the articles loose, if there is any tendency to move to one side or another, selected adjusting members 73 are actuated to adjust the respective positioning of the resilient members 70 whereby during the vibration loose articles on the table remain uniform in their distribution over the surface thereof and, in this position, continued vibratory motion can be imparted to the table and the loose articles whereby the vibratory motion imparted to said loose articles is uniform over the entire area of the table both as to amplitude and frequency. The amplitude of the vibrations can be adjusted by altering the relative positioning of the cams 42 and 44 whereby the machine will provide selected amplitude of vibratory movement and the speed of rotation of the shaft 26 will provide the desired frequency. With this arrangement, desired vibratory movement and impacting by loose articles may be obtained with uniformity over the table surface.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. An article vibrating machine including,
   (a) a support,
   (b) a table having a flat top surface adapted to support articles for vertical vibratory movement,
   (c) a shaft rotatable on the support and spaced below the table,
   (d) means on the shaft and operative in response thereto to impart an oscillatory movement,
   (e) a resilient connector between the means on the shaft and the table center for transmitting the oscillatory movement thereto,
   (f) a plurality of resilient means disposed in spaced relation and equally spaced from the table center and having upper end portions in supporting engagement with said table, and
   (g) a vertically adjustable means on the support for each of said resilient means and engaged with lower end portions thereof and operative to bodily move the respective resilient means to level the table and support said resilient means for cooperation with the resilient connector transmitting the oscillatory movement to the table to provide uniformity in the vibratory motion in amplitude and frequency over the surface of the table.

2. An article vibrating machine including,
   (a) a support,
   (b) a table having a flat top surface adapted to support articles for vertical vibratory movement, said table having spaced bottom opening sockets therein,
   (c) a shaft rotatable on the support and spaced below the table,
   (d) means on said shaft and operably connected to the table on a line through the center of the table to impart vertical vibratory movement thereto,
   (e) a plurality of vertically adjustable screws threadedly engaged with the support and spaced outwardly relative to the vertical line through the table center, said screws having heads,
   (f) a plurality of coil springs each having an end seated on the head of a respective vertically adjustable screw and opposed ends engaging in sockets in said table to resiliently mount same on the support, and
   (g) means for rotating said shaft to impart vertical vibratory movement to the table,
   (h) said adjustable screws being operable to bodily move the respective coil springs to level the table and provide uniformity in amplitude and frequency of the vibratory movement of the table over the area of the table top.

3. An article vibrating machine including,
   (a) a support,
   (b) a table having a flat top surface adapted to support articles for vertical vibratory movement,
   (c) a shaft rotatable on the support and spaced below the table,
   (d) an eccentric on the shaft and substantially on a vertical line through the center of the table,
   (e) an eccentric strap encircling the eccentric and rotatable thereon,
   (f) a resilient non-extendible connector between the eccentric strap and the table center and having rigid connection therewith, (g) a plurality of vertically adjustable means on the support and spaced outwardly relative to a vertical line through the table center, (h) a resilient means on each vertically adjustable means and engaging said table to resiliently mount same on the support, and (i) means for rotating said shaft to impart vertical vibratory movement to the table, (j) said adjustable means being operable to bodily move the respective resilient means to level the table and provide uniformity in amplitude and frequency of the vibratory movement of the table over the area of the table top.

4. A machine as set forth in claim 3 wherein, (a) said resilient means are coil springs having upper ends seated in sockets in the under side of the table, and (b) said adjustable means are adjusting screws having threaded engagement with the support with said coil springs seated on the heads of said screws for vertical movement thereby.

5. A machine as set forth in claim 3 wherein, (a) the resilient connector between the eccentric strap and table center is a flat spring connector, and (b) said eccentric is adjustable to vary the throw thereof and the amplitude of the vibratory movement imparted to the table.

6. A machine as set forth in claim 4 wherein, (a) the resilient connector between the eccentric strap and table center is a flat spring connector, and (b) said eccentric is adjustable to vary the throw thereof and the amplitude of the vibratory movement imparted to the table.

References Cited in the file of this patent

UNITED STATES PATENTS

| | | |
|---|---|---|
| 369,233 | Coxe et al. | Aug. 30, 1887 |
| 1,418,561 | Gynn | June 6, 1922 |
| 2,668,530 | Tackaberry | Feb. 9, 1954 |
| 2,765,478 | Pinto | Oct. 9, 1956 |
| 3,022,520 | Finger | Feb. 27, 1962 |
| 3,040,342 | Broers | June 26, 1962 |